(12) United States Patent
Thömmes et al.

(10) Patent No.: US 10,391,956 B2
(45) Date of Patent: Aug. 27, 2019

(54) VOLTAGE DISCONNECTION OF A HIGH-VOLTAGE VEHICLE

(71) Applicant: AUDI AG, Ingolstadt (DE)

(72) Inventors: Marco Thömmes, Ingolstadt (DE); Margot Höhne, Ingolstadt (DE); Felix Engelhard, Ingolstadt (DE); Thomas Bittner, Ingolstadt (DE); Heinz Neugebauer, Seubersdorf (DE)

(73) Assignee: AUDI AG, Ingolstadt (DE)

( * ) Notice: Subject to any disclaimer, the term of this patent is extended or adjusted under 35 U.S.C. 154(b) by 188 days.

(21) Appl. No.: 14/783,178

(22) PCT Filed: Mar. 19, 2014

(86) PCT No.: PCT/EP2014/000749
§ 371 (c)(1),
(2) Date: Oct. 8, 2015

(87) PCT Pub. No.: WO2014/166587
PCT Pub. Date: Oct. 16, 2014

(65) Prior Publication Data
US 2016/0059806 A1    Mar. 3, 2016

(30) Foreign Application Priority Data

Apr. 11, 2013    (DE) .................... 10 2013 006 254

(51) Int. Cl.
*B60R 16/03*    (2006.01)
*B60L 1/00*    (2006.01)
(Continued)

(52) U.S. Cl.
CPC ............ *B60R 16/03* (2013.01); *B60L 1/00* (2013.01); *B60L 3/0046* (2013.01); *B60L 3/04* (2013.01);
(Continued)

(58) Field of Classification Search
CPC ........................................................ B60L 1/00
(Continued)

(56) References Cited

U.S. PATENT DOCUMENTS 6,948,577 B2 *    9/2005    Wakitani ............... B60L 7/003
                                                180/65.1
7,028,819 B2 *    4/2006    Saito ................ B60G 17/0185
                                                191/2
(Continued)

FOREIGN PATENT DOCUMENTS

CN    101909920    12/2010
CN    102164780    8/2011
(Continued)

OTHER PUBLICATIONS

Translation of DE102011104224.*
(Continued)

*Primary Examiner* — Jacob S. Scott
*Assistant Examiner* — Michael E Butler
(74) *Attorney, Agent, or Firm* — Henry M. Feiereisen LLC

(57) ABSTRACT

In a method for securing a high voltage on-board electric grid of a motor vehicle for repair and/or maintenance of the motor vehicle, the energy inflow of an energy supply unit into the onboard electric grid is blocked during or after a voltage disconnection of the high-voltage on-board electric grid, in which an energy inflow of the energy supply unit to the high-voltage on-board electric grid is interrupted. Additionally or alternatively, the energy inflow of at least one other energy supply device is blocked, wherein the at least one other energy inflow is designed in order to supply energy from a further energy source to the high-voltage on-board electric grid.

4 Claims, 1 Drawing Sheet

(51) Int. Cl.
*B60L 3/00* (2019.01)
*B60L 3/04* (2006.01)
*H02J 7/00* (2006.01)
*B62D 65/00* (2006.01)
*B60L 53/14* (2019.01)
*B60L 50/62* (2019.01)
*B60L 50/60* (2019.01)

(52) U.S. Cl.
CPC ............... *B60L 50/62* (2019.02); *B60L 50/66* (2019.02); *B60L 53/14* (2019.02); *B62D 65/005* (2013.01); *H02J 7/0032* (2013.01); B60L 2210/30 (2013.01); B60L 2250/10 (2013.01); Y02T 10/6217 (2013.01); Y02T 10/7005 (2013.01); Y02T 10/705 (2013.01); Y02T 10/7072 (2013.01); Y02T 10/7077 (2013.01); Y02T 10/7241 (2013.01); Y02T 90/127 (2013.01); Y02T 90/14 (2013.01)

(58) Field of Classification Search
USPC ........................................................ 701/29.1
See application file for complete search history.

(56) References Cited

U.S. PATENT DOCUMENTS

| | | | |
|---|---|---|---|
| 7,336,002 B2* | 2/2008 | Kato ................... | F02N 11/0866 307/10.6 |
| 7,944,158 B2* | 5/2011 | Jiang .................. | H02P 5/747 310/112 |
| 8,970,169 B2 | 3/2015 | Thömmes et al. | |
| 9,057,750 B2 | 6/2015 | Thömmes | |
| 2003/0000758 A1 | 1/2003 | Bruck et al. | |
| 2006/0132085 A1* | 6/2006 | Loubeyre ............ | B60K 6/48 320/104 |
| 2007/0145819 A1* | 6/2007 | Lin .................... | B60T 8/172 303/146 |
| 2008/0315830 A1* | 12/2008 | Bertness ............. | G01R 31/3648 320/104 |
| 2009/0040029 A1* | 2/2009 | Bridges ............... | G06Q 50/06 340/12.37 |
| 2010/0087974 A1* | 4/2010 | Nakajima ............ | B60L 7/003 701/22 |
| 2010/0087987 A1* | 4/2010 | Huang ................ | B60W 40/08 701/36 |
| 2010/0256859 A1* | 10/2010 | Leyerle .............. | G08B 25/016 701/29.6 |
| 2010/0332065 A1* | 12/2010 | Lin ..................... | B60L 7/16 701/22 |
| 2011/0001356 A1* | 1/2011 | Pollack ............... | B60L 11/1842 307/31 |
| 2011/0016063 A1* | 1/2011 | Pollack ............... | B60L 11/1824 705/412 |
| 2011/0033761 A1 | 2/2011 | Walter | |
| 2013/0158778 A1* | 6/2013 | Tengler .............. | G08G 1/096716 701/31.5 |
| 2013/0197748 A1* | 8/2013 | Whitaker ............ | G01M 17/00 701/34.4 |
| 2013/0204455 A1* | 8/2013 | Chia .................. | G07C 5/008 701/1 |
| 2014/0002021 A1* | 1/2014 | Bertness ............. | B60L 11/1838 320/109 |
| 2014/0091763 A1 | 4/2014 | Thömmes et al. | |
| 2014/0140752 A1* | 5/2014 | Maruyama .......... | B43K 7/02 401/209 |
| 2014/0292345 A1* | 10/2014 | Matumoto ........... | G01R 31/3658 324/434 |
| 2014/0374475 A1* | 12/2014 | Kallfelz .............. | H04Q 9/00 235/375 |
| 2015/0045984 A1* | 2/2015 | Hui .................... | B60R 16/02 701/1 |
| 2015/0377162 A1* | 12/2015 | Kamioka ............ | F02D 29/02 701/112 |

FOREIGN PATENT DOCUMENTS

| | | |
|---|---|---|
| DE | 199 62 680 | 7/2001 |
| DE | 10 2007 050 377 | 4/2009 |
| DE | 603 19 570 | 4/2009 |
| DE | 10 2010 045 896 | 5/2011 |
| DE | 10 2010 052 375 | 5/2012 |
| DE | 10 2010 063 126 | 6/2012 |
| DE | 10 2011 104 224 | 12/2012 |
| DE | 10 2011 104 819 | 12/2012 |
| GB | 2 335 404 | 9/1999 |
| WO | WO 2011/082733 | 7/2011 |
| WO | WO 2012/072308 | 6/2012 |
| WO | WO 2013/018209 | 2/2013 |

OTHER PUBLICATIONS

International Search Report issued by the European Patent Office in International Application PCT/EP2014/000749.
Chinese Search Report dated Aug. 26, 2016 with respect to counterpart Chinese patent application 201480020656.8.
Translation of Chinese Search Report dated Aug. 26, 2016 with respect to counterpart Chinese patent application 201480020656.8.

* cited by examiner

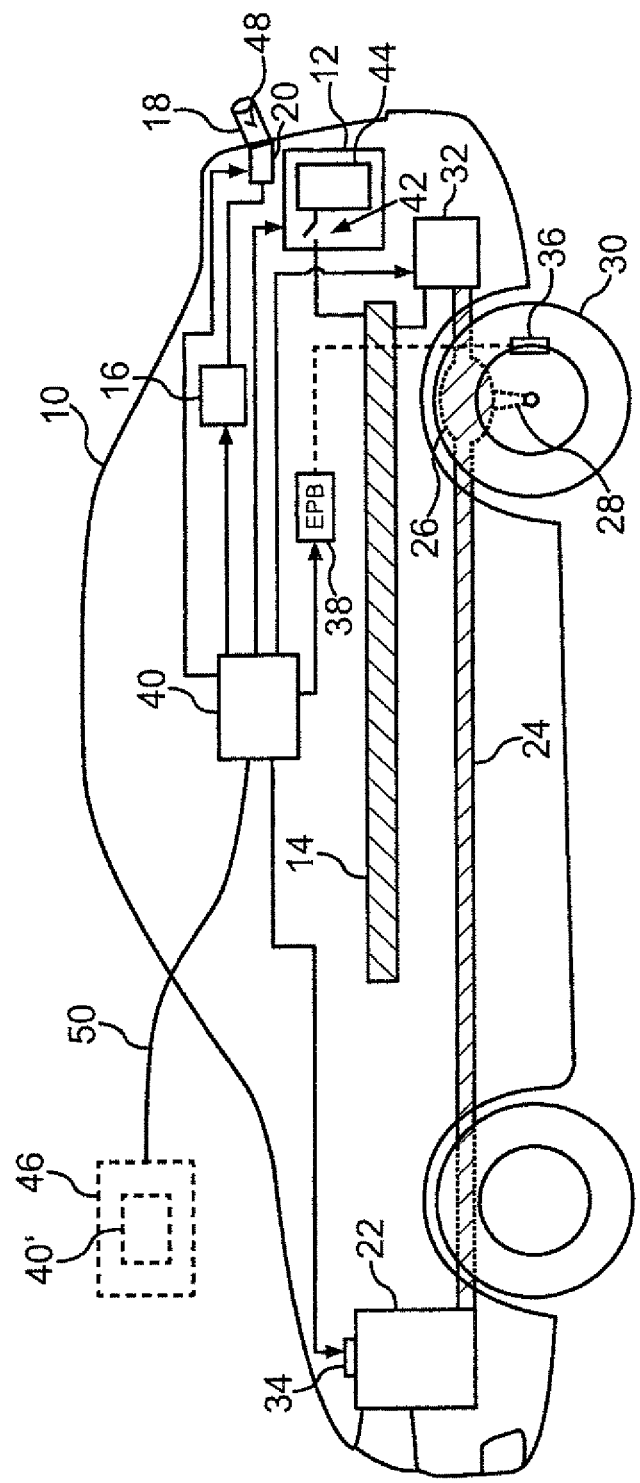

VOLTAGE DISCONNECTION OF A HIGH-VOLTAGE VEHICLE

CROSS-REFERENCES TO RELATED APPLICATIONS

This application is the U.S. National Stage of International Application No. PCT/EP2014/000749, filed Mar. 19, 2014, which designated the United States and has been published as International Publication No. WO 2014/166587 and which claims the priority of German Patent Application, Serial No. 10 2013 006 254.3, filed Apr. 11, 2013, pursuant to 35 U.S.C. 119(a)-(d).

BACKGROUND OF THE INVENTION

The invention relates to a method for securing a high-voltage on-board electric grid of a motor vehicle for repair and/or maintenance work on the motor vehicle. The invention also includes a motor vehicle with a high-voltage onboard electric grid and a diagnostic device for such a motor vehicle.

During work on a high-voltage system of a motor vehicle or in close proximity to such a high-voltage system it has to be ensured that this system is free of voltage. For this purpose a voltage disconnection is performed. A first important step hereby is that a connection between a high-voltage battery of the high-voltage system and a high-voltage onboard electric grid for distributing the high-voltage in the motor vehicle is interrupted. For this purpose, usually contactors are provided in the high-voltage battery, which are opened by a control device. Opening of the contactors then blocks the energy supply of the high-voltage battery into the high-voltage onboard electric grid. Subsequently the electric voltage in the high-voltage onboard electric grid can then be manually measured by means of a voltage tester or also automatically by means of a testing device fixedly installed in the motor vehicle, i.e., a control device. Depending on the circumstances a residual voltage, for example stored by capacitances in the high-voltage onboard electric grid, may have to be eliminated. Subsequently a person may then perform the necessary work on the motor vehicle.

During this work it has to be ensured that electric voltage is not inadvertently built up again in the high-voltage onboard electric grid. For this purpose the professional association requires that certain steps must not be performed after the voltage disconnection has occurred because they may lead to a build-up of electric voltage in the high-voltage onboard electric grid again. For example, one must not insert the charging plug of a vehicle-external charging device into the plug-in shaft of the charging device of the motor vehicle once the voltage disconnection has occurred. In a vehicle type, which additionally has an internal combustion engine to drive an electric generator in the motor vehicle, also the internal combustion engine must not be restarted because this would drive the generator and produce electric voltage. Motor vehicle types with such additional internal combustion engines are also known as plug-in-vehicles or range-extender-vehicles. The described safety measures are usually implemented by a process, i.e., exact instructions have to be followed by persons working on the motor vehicle. This leaves the human as the greatest uncertainty factor during the work because, due to uncoordinated collaboration, a person may inadvertently insert a charging plug while another person for example still works underneath the vehicle.

From DE 10 2010 063 126 A1 and WO 2012 072 308 A2 charging devices with a device for separating a high-voltage battery from an intermediate circuit and for separating current-conducting lines of a charging cable and a monitoring device are known, which is configured to monitor the charging device with regard to a dangerous situation which causes the risk of an electric shock. The device for separation and an additional discharging device are configured to respectively generate a control signal in dependence on the determined dangerous situation.

IN DE 10 2011 104 819 A1 a motor vehicle high-voltage system is described in which in a first high-voltage range after separation from a second high-voltage range is secured against reactivation by a separation device. The securing is accomplished by of switching the battery contactor current-less, setting a blocking bit in a high-voltage component such as an electric motor, deactivating a charging device for the high-voltage system or switching off an electric motor in order to prevent voltage generated by pushing the motor vehicle.

DE 10 2010 052 375 A1 describes a motor vehicle in which a traction battery can be charged via a charging cable, wherein an electric contact of a charging contact element of the energy storage unit is interrupted when the charging cable is not connected with the charging connection element within a defined period of time after turning off the motor vehicle. To accomplish the blocking for example a pin can be inserted motor-driven into a connection socket of the charging device.

SUMMARY OF THE INVENTION

The invention is based on the object to secure a high-voltage onboard electric grid of a motor vehicle by technical means for repair and/or maintenance work instead of the described procedural measures.

The object is solved by the devices of the independent patent claims. Advantageous refinements of the invention are set forth by the dependent claims.

The method according to the invention is based on the approach to cause a voltage disconnection for securing the high-voltage onboard electric grid, as it was described above, i.e., to interrupt the energy supply of an energy supply device of the motor vehicle into the high-voltage onboard electric grid. This can for example be accomplished in the described manner by opening a contactor, via which a high-voltage battery can be coupled with the high-voltage onboard electric grid. In this case the high-voltage battery would be the energy supply device or a part thereof. The energy supply device can additionally or alternatively thereto include a fuel cell. The interruption of the energy supply itself is not part of the invention. It may be performed in a manner known per se for example manually or by a control device.

In order to improve the securing of the high-voltage onboard electric grid, the method according to the invention provides for an additional deactivation or blocking, i.e., it is made impossible for an operator to reconnect the energy supply device to the high-voltage onboard electric grid, for example by deactivating a control switch of the energy supply or by mechanically blocking the energy supply. In the case of the mentioned contactor for example the control signal can be suppressed for closing the contactor or the contactor can be mechanically blocked.

In addition or as an alternative to blocking the mentioned energy supply, the method according to the invention provides for blocking at least one further energy supply into the high-voltage onboard electric grid. The at least one further energy supply in this case is an inflow which is configured to supply the energy of a further energy source into the high-voltage onboard electric grid, for example an optionally connectable energy source. The invention is thus based on the recognition that only a relatively small number of energy supplies exists in a high-voltage onboard electric grid via which a high-voltage can be fed into the high-voltage onboard electric grid after a voltage-disconnection. By automatically blocking these energy inflows, i.e., without requiring the action of an operator, a securing is accomplished by technical measures instead of procedural measures, so that even an inadvertent erroneous action by a person in charge of working on the motor vehicle does not lead to an electric high-voltage in the high-voltage onboard electric grid. The method according to the invention thus has the advantage that the human as greatest uncertainty factor is excluded from the process and process errors are prevented by technical measures.

The automatic blocking of the energy inflows is controlled by a control device. For example a program module of a control device or also by a separate hardware. As hardware the control device can be installed in the motor vehicle or can be connected for repair and/or maintenance work or can communicate with the motor vehicle via a radio connection. In connection with the provision of the control device in the motor vehicle for example the motor control unit of the motor vehicle or a gateway of a communication bus of the motor vehicle, for example a CAN bus (CAN=controller area network) can be enabled for performing the method according to the invention. The functions of the control device can also be distributed to multiple devices and/or program modules.

According to the method, an electric generator provided in the motor vehicle for generating electric energy is blocked as one of the energy inflows. For this purpose for example a voltage output of the generator can be short-circuited or a switch for the magnetic excitation of the generator can be deactivated. For example in the second case the coil currents in the generator can be interrupted by opening one or multiple switching elements.

A refinement of this method provides that for blocking the generator, the generator is not blocked itself but in the case of an internal combustion engine, which is mechanically coupled with the generator, a motor control unit of the internal combustion engine is deactivated. As a result the motor can no longer be activated and thus also the generator cannot be inadvertently operated.

Instead of deactivating the motor control unit or in addition thereto, it can be provided to fix a shaft for driving the generator by means of an electro-hydraulic brake of the motor vehicle, i.e., for example the parking brake of the motor vehicle. By fastening or engaging such an electro-hydraulic brake, a shaft of the drive train is usually also blocked indirectly via a differential, via which shaft the internal combustion engine is mechanically coupled with the generator. This also blocks the transmission of mechanical energy from the internal combustion engine to the generator and thus prevents the introduction of electrical energy into the high-voltage onboard electric grid via the generator.

In the method according to the invention different embodiments result depending on what further energy inflows are present in the vehicle and which ones of those are blocked in a targeted manner by the control device.

According to one embodiment of the method, a charging device is blocked as further energy inflow, via which electrical energy from a stationary electrical supply network of an energy provider can be fed into an energy storage of the motor vehicle, for example in the form of a high-voltage battery. Such a charging device usually has at least one controllable switching element in a step-up converter or step-down converter or in other switching elements, in particular a power semiconductor switch, such as a transistor. A controllable switching element is generally characterized in that it can be switched between a conducting and a blocking state by means of an electrical signal. In the transistor this signal is applied at the base or the gate. In an embodiment of the method such a control signal can be blocked, so that the switching elements remain non-conducting and the charging device is rendered functionless.

Another embodiment of the method provides to block a plug-in shaft for a charging plug as a further energy inflow. For this, the charging shaft is locked by a locking device of the plug-in shaft while the charging plug is detached. For example a cover plate of the plug-in shaft, which for example protects the plug-in shaft against rain, can be locked in a similar manner as is usually done by a central lock of the motor vehicle.

In connection with the locking of a plug-in shaft, a particular embodiment of the method provides to insert a pin or retaining pin into the plug-in shaft as locking device of the plug-in shaft, which pin retains the charging plug in the plug-in shaft. Normally such a retaining pin is only inserted when the charging plug is inserted so that the charging plug cannot be pulled out. When the charging plug is pulled out, the same retaining pin can be used for the described second function by inserting the retaining pin into the plug-in shaft when the charging plug is detached, thereby blocking the insertion of the charging plug. Using the retaining pin has the advantage that the latter is usually already present because plugs have to be locked during the charging process.

Preferably it is tested during the voltage disconnection whether the charging plug is inserted. When the charging plug is inserted the car shop employee is alerted to this fact. This can either be accomplished directly via a control device provided in the motor vehicle or via a diagnostic device, which communicates with the motor vehicle. Only when the charging plug is pulled out or was pulled out after issuance of the warning, the voltage disconnection is then maintained via the diagnostic device (or directly by the control device in the motor vehicle). When the charging plug was pulled, the described pin or retaining pin for locking the plug-in shaft is then inserted so that no charging plug can be inadvertently inserted, for example by an inattentive person, during the entire time of the voltage disconnection.

As explained above, the control device can be integrated into the motor vehicle for example as integral control device or it can also be distributed over multiple control devices. In this regard the invention also includes a motor vehicle with a high-voltage onboard electric grid and a control device, which is configured to implement an embodiment of the method according to the invention. The motor vehicle according to the invention is preferably constructed as passenger car.

Another possibility is to externally control the motor vehicle in order to accomplish the voltage disconnection of the high-voltage onboard electric grid, i.e., the blocking of the inflows according to the invention. In this connection the invention includes a diagnostic device for a motor vehicle. The diagnostic device according to the invention has a communication device, which is configured to transmit control signals to a communication interface of the motor vehicle. The communication device can for example include communication cables and a communication module, wherein the communication module can for example be connected to an OBD-bus (OBD—onboard diagnosis) or a CAN-bus of the motor vehicle. The communication device can however also implement a radio interface of the diagnostic device, i.e., it can for example include a WLAN-module (WLAN—wireless local are electric grid). The diagnostic device according to the invention also includes a control device, which is configured to generate the mentioned control signals for blocking the energy inflows of a high-voltage onboard electric grid of the motor vehicle according to an embodiment of the method according to the invention. The diagnostic device according to the invention has the advantage to enable implementation of the method according to the invention for multiple motor vehicles, without the motor vehicles having to be specially equipped.

BRIEF DESCRIPTION OF THE DRAWING

In the following the invention is explained again by way of a concrete exemplary embodiment. For this the sole FIGURE shows an embodiment of the motor vehicle according to the invention.

DETAILED DESCRIPTION OF PREFERRED EMBODIMENTS

The FIGURE shows a schematic representation of a motor vehicle 10, for example a passenger car. The motor vehicle 10 can have one or multiple energy supply devices. In the example shown in the FIGURE an energy storage of the motor vehicle, in particular a high-voltage battery 12, is provided as energy supply. The high-voltage battery 12 can be electrically connected with a high-voltage onboard electric grid 14. The high-voltage onboard electric grid 14 or short onboard electric grid 14, can for example have electric rails and/or wires via which the electric high-voltage energy produced by the high-voltage battery 12 is conducted to (not shown) electric high-voltage consumers. A high-voltage in the context of the invention means an electrical voltage, which is greater than 60 volts, in particular greater than 200 volts, for example 400 volts. One of the electrical high-voltage consumers can for example be an (not shown) electric motor, by means of which the motor vehicle 10 can be driven.

For charging the high-voltage battery 12, the motor vehicle 10 has a charging device 16 which can be coupled with the high-voltage battery 12 via the onboard electric grid 14. The charging device 16 can receive electric current for example from a vehicle-external electric supply network. For this the motor vehicle 10 has a plug-in shaft 18 for inserting a plug of a charging cable. The plug-in shaft is part of a connection device 20, which is electrically connected with the charging device 16.

The motor vehicle 10 can also have an internal combustion engine 22. The internal combustion engine 22 can for example be coupled with a wheel 30 of the motor vehicle via a shaft 24, a differential 26 and an axle 28 in order to thereby drive the wheel 30 for a drive of the motor vehicle. Via the shaft 24 the internal combustion engine 22 can also be coupled with a generator 32 for generating a high-voltage. The generator 32 is coupled with the onboard electric grid 14. The high-voltage of the generator 32 is transmitted to the high-voltage battery 12 for charging the high-voltage battery. While the internal combustion engine drives the wheel 30, a portion of the drive power of the internal combustion engine 22 can hereby also be used for driving the generator 32. The generator generates a high-voltage, which can be used via the onboard electric grid 14 for charging the high-voltage battery 12. The generator 22 can also be an electric machine, which can also be used for driving the motor vehicle 10 as in the case of a plug-in-hybrid-vehicle or a range-extender-vehicle.

The internal combustion engine 22 is controlled via a motor control unit 34. The drive wheel 30 can be blocked by an electronic brake (EPB—electronic power brake), for example for parking the motor vehicle 10. This brake includes an electric-hydraulic brake 36 and a control device 38 for controlling the brake 36.

For maintenance and/or repair work it can be very reliably ensured that the onboard electric grid 14 in the motor vehicle 10 is free of voltage. For this a control device 40 is provided in the motor vehicle 10, which can be coupled with the connection device 20, the charging device 16, the high-voltage battery 12, the generator 32, the control device 38 of the brake and the motor control unit 34. Only one or several of these elements may be coupled with the control device 40. The control device 40 can be configured as software and/or hardware. The control device 40 can hereby be realized by a single control device or by several different control devices. For example a high-voltage coordinator known per se can be correspondingly further refined for controlling the high-voltage system of the motor vehicle 10 (including the high-voltage battery 12, the onboard electric grid 14 and the high-voltage consumer). Also a gateway of a communication bus of the motor vehicle 10 can be part of the control device 40.

For securing the motor vehicle 10 for the mentioned work, a contactor 42 of the high-voltage battery 12 can be switched by the control device 40 so that the high-voltage battery is open and a current flow from battery cells 44 of the high-voltage battery 12 to the onboard electric grid 14 is interrupted. In addition the following securing is possible by the control device 40 via the mentioned couplings and by generating corresponding control signals.

During the voltage disconnection the control device 40 tests whether a charging plug is inserted in the plug-in shaft 18. When the charging plug is inserted, an operator is alerted to this fact, for example via a (not shown) monitor or another display device. For example the disconnection may have been initiated by a diagnostic device 46, which was connected to the motor vehicle 10 and for this a corresponding voltage disconnection signal may have been sent to the control device 40. Then the control device 40 can communicate with a diagnostic device 46 and the warning can be outputted via a monitor of the diagnostic device 46. Only when the control device 40 recognizes that the charging plug is pulled out, the voltage disconnection can be maintained by the diagnostic device 46. When the charging plug was pulled out for example a retaining pin 48 is inserted into the plug-in shaft 18 for locking the plug-in shaft, wherein an actuator required therefore may be a part of the connection device 20. Such a retaining pin 48 is known from the state of the art and is actually used for securely retaining the charging plug inserted in the charging shaft 18 during the charging process. When the retaining pin 48 is inserted into the plug-in shaft 18 while the plug is pulled out, a charging plug cannot inadvertently be inserted into the plug-in shaft 18 for example by a third person during the entire time of the voltage disconnection.

However, also the internal combustion engine 22 can be locked by the control device 40 so as to prevent the internal combustion engine from starting. The locking can for example be software-based in that the control device 40 controls the motor control unit 44 and deactivates it. The locking can also be accomplished by the electro-hydraulic brake 36 for which the brake 36 is then activated by controlling the control device 38 by the control device 40, so that the axle 28 and with this the shaft 24 can no longer be rotated by the internal combustion engine 22. Thus the unintended starting of the internal combustion engine 22 for example by a third person is prevented. This also prevents high-voltage being fed into the onboard electric grid 14 via the generator.

The control device 14 can also switch switching elements inside the generator 32 into a locked state, so that even when the shaft 24 is driven the generator 32 does not provide high-voltage to the onboard electric grid 14. Overall the example shows how humans, as greatest uncertainty factor, can be excluded from the process of securing a motor vehicle by means of a voltage disconnection, and how instead a voltage disconnection can be accomplished by technical measures.

Due to the fact that the control device 40 performs the described measures for voltage disconnection of the onboard electric grid 14, the individual inflows of electric energy into the onboard electric grid 14 are blocked so that during the described work on the motor vehicle 10 no dangerous electrical high-voltage can be generated in the onboard electric grid 14 to which a person performing the work may be exposed.

The diagnostic device 46 can for example be connected with the control device 40 via a communication cable 50 and exchange control signals via the communication cable 50. Instead of or in addition to the control device 40 in the motor vehicle 10, a control device 40 can also be provided in the diagnostic device 46, which control device 40 can generate the control signals for controlling one or multiple or all of the elements 20, 16, 42, 32, 38, 34, so that the energy inflows of electrical energy into the onboard electric grid are directly interrupted or blocked by the diagnostic device 46.

What is claimed is:

1. A method for securing a high-voltage onboard electric grid operated in a range of at least 300 V up to 400 V of a motor vehicle for repair or maintenance work on the motor vehicle, comprising:

during or after a disconnection of the high-voltage onboard grid from voltage, in which an energy inflow from an energy supply device into the high-voltage onboard grid is interrupted, blocking with a control device configured to generate control signals the energy inflow of the energy supply device or an energy inflow of at least one other energy supply device into the onboard electric grid, said other energy supply device comprising an electric generator;

implementing a communication device including a communication module connected to an OBD-bus, said communication device being configured to transmit the control signals to a communication interface of the motor vehicle; and determining whether a charging plug for charging the energy supply device is inserted, and when the charging plug is inserted, suspending the voltage disconnection until the charging plug is pulled out and issuing a warning, wherein the blocking of the energy inflow of the electric generator is accomplished in at least three ways, a first way in which a motor control unit of an internal combustion engine coupled with the electric generator is deactivated, a second way in which a voltage output of the generator is short-circuited, and a third way in which a shaft for driving the generator is arrested by means of an electric hydraulic brake of the motor vehicle.

2. The method according to claim 1, wherein the at least one other blocking energy supply device comprises a charging and wherein the blocking step further comprises blocking a control signal of at least one controllable switching element of the charging device.

3. The method of claim 1, wherein the at least one other energy supply device comprises a plug-in shaft for a charging plug, and wherein the blocking step further comprises locking the plug-in shaft with a locking device, when the charging plug is pulled out.

4. The method of claim 3, wherein the locking device is constructed as a retaining pin for retaining the charging plug in the plug-in shaft, said retaining pin being inserted into the plug-in shaft.

* * * * *